United States Patent
Batts et al.

(10) Patent No.: US 11,029,688 B2
(45) Date of Patent: Jun. 8, 2021

(54) RUMBLE STRIP FOLLOWING FOR AUTOMATED VEHICLE STEERING

(71) Applicant: Motional AD LLC, Boston, MA (US)

(72) Inventors: Zachary T. Batts, Pittsburgh, PA (US); Ludong Sun, Pittsburgh, PA (US); Junqing Wei, Bridgeville, PA (US)

(73) Assignee: Motional AD LLC, Boston, MA (US)

( * ) Notice: Subject to any disclaimer, the term of this patent is extended or adjusted under 35 U.S.C. 154(b) by 101 days.

(21) Appl. No.: 15/920,004

(22) Filed: Mar. 13, 2018

(65) Prior Publication Data

US 2019/0250618 A1 Aug. 15, 2019

Related U.S. Application Data

(60) Provisional application No. 62/629,302, filed on Feb. 12, 2018.

(51) Int. Cl.
*G05D 1/02* (2020.01)
*G05D 1/00* (2006.01)

(52) U.S. Cl.
CPC ......... *G05D 1/0212* (2013.01); *G05D 1/0227* (2013.01); *G05D 1/0231* (2013.01); *G05D 1/0274* (2013.01); *G05D 1/0088* (2013.01); *G05D 2201/0213* (2013.01)

(58) Field of Classification Search
None
See application file for complete search history.

(56) References Cited

U.S. PATENT DOCUMENTS

| 2005/0125153 A1 | 6/2005 | Matsumoto et al. | |
| 2014/0249718 A1* | 9/2014 | Liu | G08G 1/16 701/41 |
| 2016/0078760 A1* | 3/2016 | Crickmore | G08G 1/04 701/117 |

* cited by examiner

*Primary Examiner* — Joshua E Rodden
(74) *Attorney, Agent, or Firm* — Fish & Richardson P.C.

(57) ABSTRACT

A rumble-strip following system for automated vehicle steering includes a vibration-detector, a steering-device, and a controller-circuit. The vibration-detector is configured to detect vibration experienced by a host-vehicle traveling a roadway. The steering-device is configured to steer the host-vehicle. The controller-circuit is in communication with the vibration-detector and the steering-device. The controller-circuit is configured to determine that the vibration is indicative of a tire of the host-vehicle contacting a rumble-strip arranged parallel to a heading of the roadway, and operate the steering-device so the tire follows the rumble-strip.

12 Claims, 3 Drawing Sheets

RUMBLE STRIP FOLLOWING FOR AUTOMATED VEHICLE STEERING

TECHNICAL FIELD OF INVENTION

This disclosure generally relates to a rumble-strip following system for automated vehicle steering, and more particularly relates to a system that operates a steering-device so a tire of a host-vehicle follows a rumble-strip along a roadway traveled by the host-vehicle.

BACKGROUND OF INVENTION

Lane-markings used for automated operation of a host-vehicle may not be detectable by a camera on the host-vehicle due to, for example, snow covering the lane-markings, wear-out (age) of the lane-markings, or new construction where new lane-marking has not yet been placed.

BRIEF DESCRIPTION OF DRAWINGS

The present invention will now be described, by way of example with reference to the accompanying drawings, in which.

DETAILED DESCRIPTION

Figure 1:
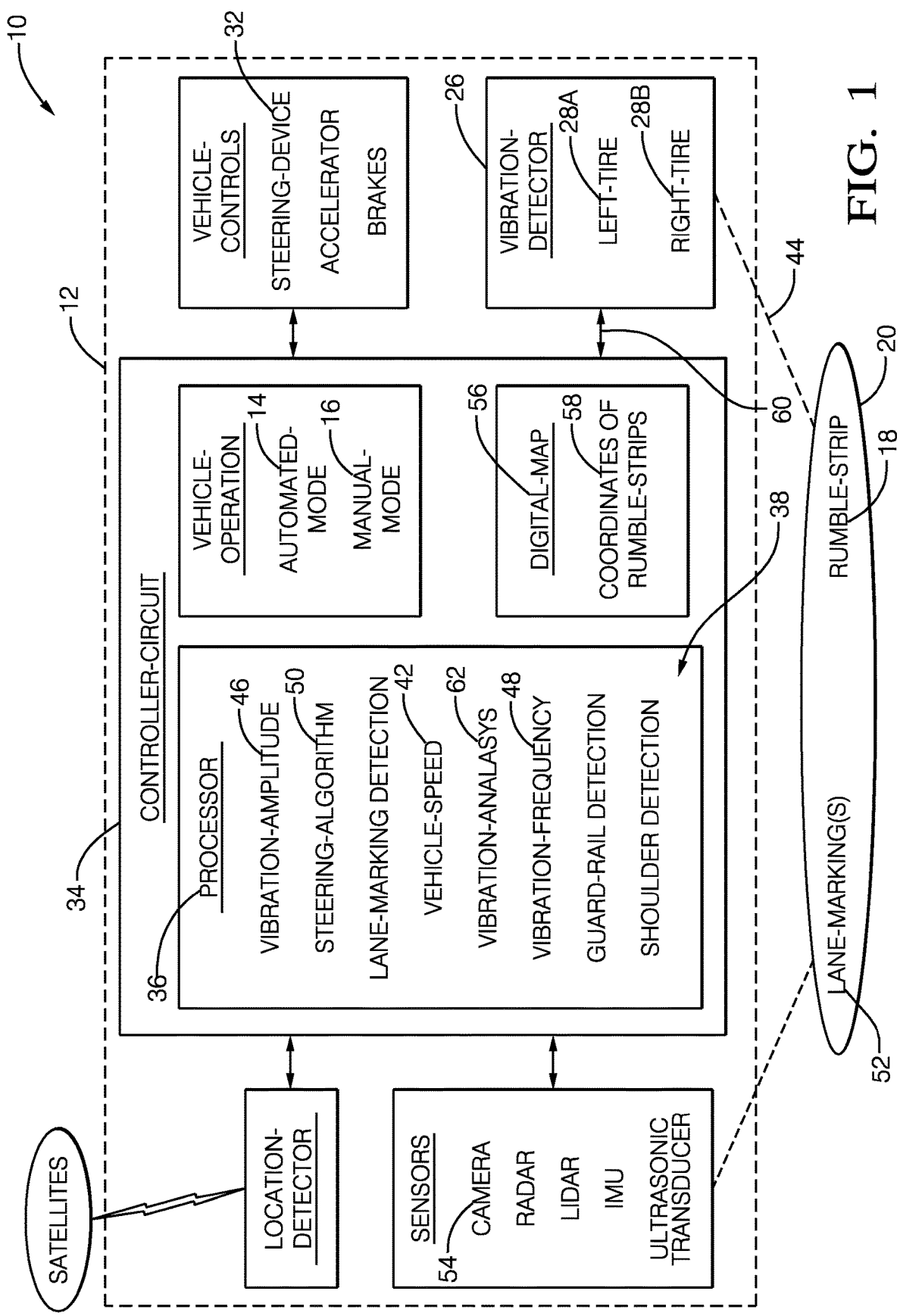
FIG. 1 is diagram of a rumble-strip following system in accordance with one embodiment.

FIG. 1 illustrates a non-limiting example of a rumble-strip following system 10, hereafter referred to as the system 10. In general, the system 10 is for automated vehicle steering of a host-vehicle 12, however the system 10 is not limited to only steering the host-vehicle 12. The host-vehicle 12 may be characterized as an automated vehicle. As used herein, the term automated vehicle may apply to instances when the host-vehicle 12 is being operated in an automated-mode 14, i.e. a fully autonomous mode, where a human-operator (not shown) of the host-vehicle 12 may do little more than designate a destination to operate the host-vehicle 12. However, full automation is not a requirement. It is contemplated that the teachings presented herein are useful when the host-vehicle 12 is operated in a semi-automated-mode (a variation on the automated-mode 14) that controls the steering of the host-vehicle 12 while the accelerator and brakes are generally controlled by the operator. The host-vehicle 12 may optionally be operable in a manual-mode 16 where the degree or level of automation may be little more than providing an audible or visual warning to the human-operator who is generally in control of the steering, accelerator, and brakes of the host-vehicle 12.

Figure 2:
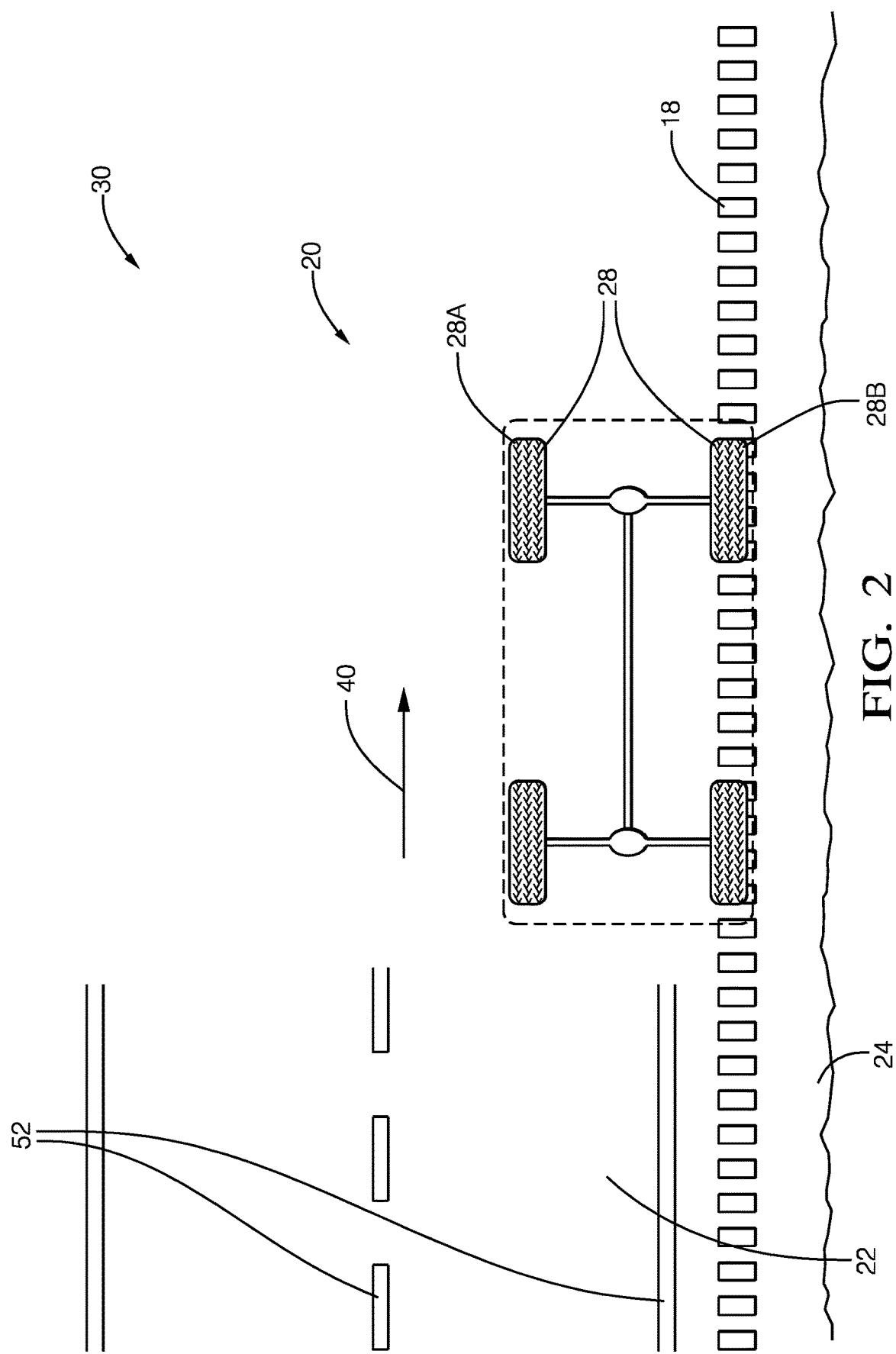
FIG. 2 is a scenario encountered by a host-vehicle equipped with the system of FIG. 1 in accordance with one embodiment.

As will be described in more detail below, the system 10 equips the host-vehicle 12 to detect vibration caused by a rumble-strip 18 (see also FIG. 2) on a roadway 20 and steer the host-vehicle 12 to follow the rumble-strip 18. As used herein, the rumble-strip 18 is any surface irregularity intentionally placed or added to the surface of the roadway 20 that is intended to provide an audible/haptic warning to a human-operator that the vehicle driven by the human-operator has departed substantially from the center of a travel-lane 22 (FIG. 2). The rumble-strip 18 may be a shoulder rumble strip located near the boundary of the travel-lane and the shoulder 24 as depicted in FIG. 2. Alternatively, the rumble-strip 18 may be a centerline rumble strip (not shown) that coincides with a center-line of the roadway 20. The rumble-strip 18 is generally a series of undulations that may be, but are not limited to: rolled-in which are applied to newly laid asphalt pavement while it is still warm and moldable; milled-in which are machined into to existing hardened asphalt or concrete roads; formed which are made when a corrugated form is pressed into fresh concrete; or raised which may be plastic or ceramic units fastened to asphalt or concrete pavement and often with a reflector built into the edge.

The system 10 includes a vibration-detector 26 configured to detect a vibration 44 experienced by the host-vehicle 12 while traveling the roadway 20. In one embodiment, the vibration-detector 26 may include, for example, a plurality of accelerometers (not shown, e.g. two accelerometers) one located on the host-vehicle near a left-tire 28A (e.g. the left-front-tire/wheel), and one located near a right-tire 28B (e.g. the right-front-tire/wheel) so that it can be readily determined when the vibration 44 is originating from the left-tire 28A, or originating from the right-tire 28B, as would be the case for the scenario 30 shown in FIG. 2 where the right-tire 28B is traveling on the rumble-strip 18. That is, the vibration-detector 26 may be configured to indicate that the vibration 44 is from a left-tire 28A or a right-tire 28B of the host-vehicle 12. Alternatively, the vibration-detector 26 may include additional accelerometers positioned near each of the rear wheels of the host-vehicle 12 which would be advantageous for tracking the rumble-strip 18 if the roadway were curved rather than straight as illustrated in FIG. 2.

The system 10 includes a steering-device 32 configured to steer the host-vehicle 12. As suggested above, the degree of automation of the host-vehicle may be limited to or operator selected to have only automated steering, thereby leaving control of the accelerator and brakes to a human-operator. Alternately, the host-vehicle 12 may be configured for, or operator selected to have fully automated vehicle operation where all vehicle-controls are computer-controlled.

The system 10 includes a controller-circuit 34, hereafter optionally referred to as the controller 34, in communication with the vibration-detector 26 and the steering-device 32. The controller 34 may include a processor 36 such as a microprocessor or other control circuitry such as analog and/or digital control circuitry including an application specific integrated circuit (ASIC) for processing data as should be evident to those in the art. Hereafter, any reference to the controller 34 being configured for something is to also be interpreted as suggesting that the processor 36 may also be configured for the same thing. The controller 34 may include memory 38, i.e. non-transitory computer-readable storage medium, including non-volatile memory, such as electrically erasable programmable read-only memory (EEPROM) for storing one or more routines, thresholds, and captured data. The memory 38 may be part of the processor 36, or part of the controller 34, or separate from the controller 34 such as remote memory stored in the cloud. The one or more routines may be executed by the controller 34 or the processor 36 to perform steps for operating (e.g. steering) the host-vehicle 12 based on signals received by the controller 34 from, but not limited to, the vibration-detector 26.

The controller-circuit 34 is, in at least one respect, configured to determine that the vibration 44 is indicative of a tire 28 (e.g. the left-tire 28A or the right-tire 28B) of the host-vehicle 12 contacting (i.e. traveling on) a rumble-strip 18 arranged parallel to a heading 40 (i.e. direction of travel)

of the roadway 20, or more specifically the heading 40 of the travel-lane 22 traveled by the host-vehicle 12. The controller 34 may be configured to determine a vehicle-speed 42 based on a signal received from, for example but not limited to, a wheel-speed-sensor (not shown), a radar, a location-device (i.e. a global-position-system or GPS receiver), or an ultrasonic-transducer configured to detect movement of the rumble-strip 18 relative to the host-vehicle 12. The controller-circuit 34 may then be configured to perform a vibration-analysis of the vibration-signal 60 from the vibration-detector, where the vibration-analysis compares, for example, a vibration-amplitude 46 and/or a vibration-frequency 48 of the vibration-signal 60 to expected values or thresholds that may be adjusted based on the vehicle-speed 42. That is, the vibration-frequency 48, e.g. the fundamental frequency, of the vibration is expected to be directly proportional to the vehicle-speed 42. If the vibration-frequency 48 is substantially different (e.g. greater than twice or less than half) from what is expected for the vehicle-speed 42 when the tire 28 is traveling on typically spaced bumps or depressions that form the rumble-strip 18, then the detected vibration may be due to some other cause such as a wheel out-of-balance or a flat tire.

The controller-circuit 34 is, in another respect, configured to operate the steering-device 32 so the tire 28 follows the rumble-strip 18. If a decrease in the vibration-amplitude 46 is detected, that may be an indication that the tire 28 is no longer centered on the rumble-strip. That is, a steering-algorithm 50 used to operate the steering-device 32 may be configured to determine a vibration-amplitude 46 of the vibration 44 and operate the steering-device 32 to maximize the vibration-amplitude 46. If a decrease in the vibration-amplitude 46 corresponds to a change in direction or change in yaw-rate detected by an inertial-measurement-unit (IMU) of the host-vehicle 12, the steering-algorithm 50 may operate the steering-device 32 to oppose the detected change in direction or change in yaw-rate to increase or maximize the vibration-amplitude 46.

It is expected that it would be preferable for automated steering aspect of the host-vehicle to steer in accordance with lane-markings 52 so the host-vehicle 12 is centered in the travel-lane 22 of the roadway 20. That is, it is expected to be preferable to follow the rumble-strip 18 only when lane-markings 52 are not detected. Accordingly, system 10 may include a camera 54 configured to detect instances of the lane-markings 52 on a roadway 20 traveled by a host-vehicle 12, and the controller-circuit 34 may be configured to operate the steering-device 32 so the tire follows the rumble-strip 18 when the camera 54 is unable to detect any instance of the lane-marking 52 on the roadway 20. That is, it is expected to be preferable that the system only steers the tire 28 to follow the rumble-strip 18 when lane-marking 52 is not detected.

The system 10 may have access to or may include a digital-map 56 that indicates coordinates 58 of a rumble-strip 18. This would be advantageous so the system 10 does not steer the host-vehicle 12 in search of an instance of the rumble-strip 18 when none is present. Accordingly, the controller-circuit 34 may be configured to operate the steering-device to steer the host-vehicle 12 towards the rumble-strip 18 only when the digital-map 56 indicates that an instance of the rumble-strip 18 is present beside or near the host-vehicle 12. That is, the system 10 only tries to find/follow a rumble-strip when the presence of a rumble-strip is indicated by the digital-map 56.

Figure 3:
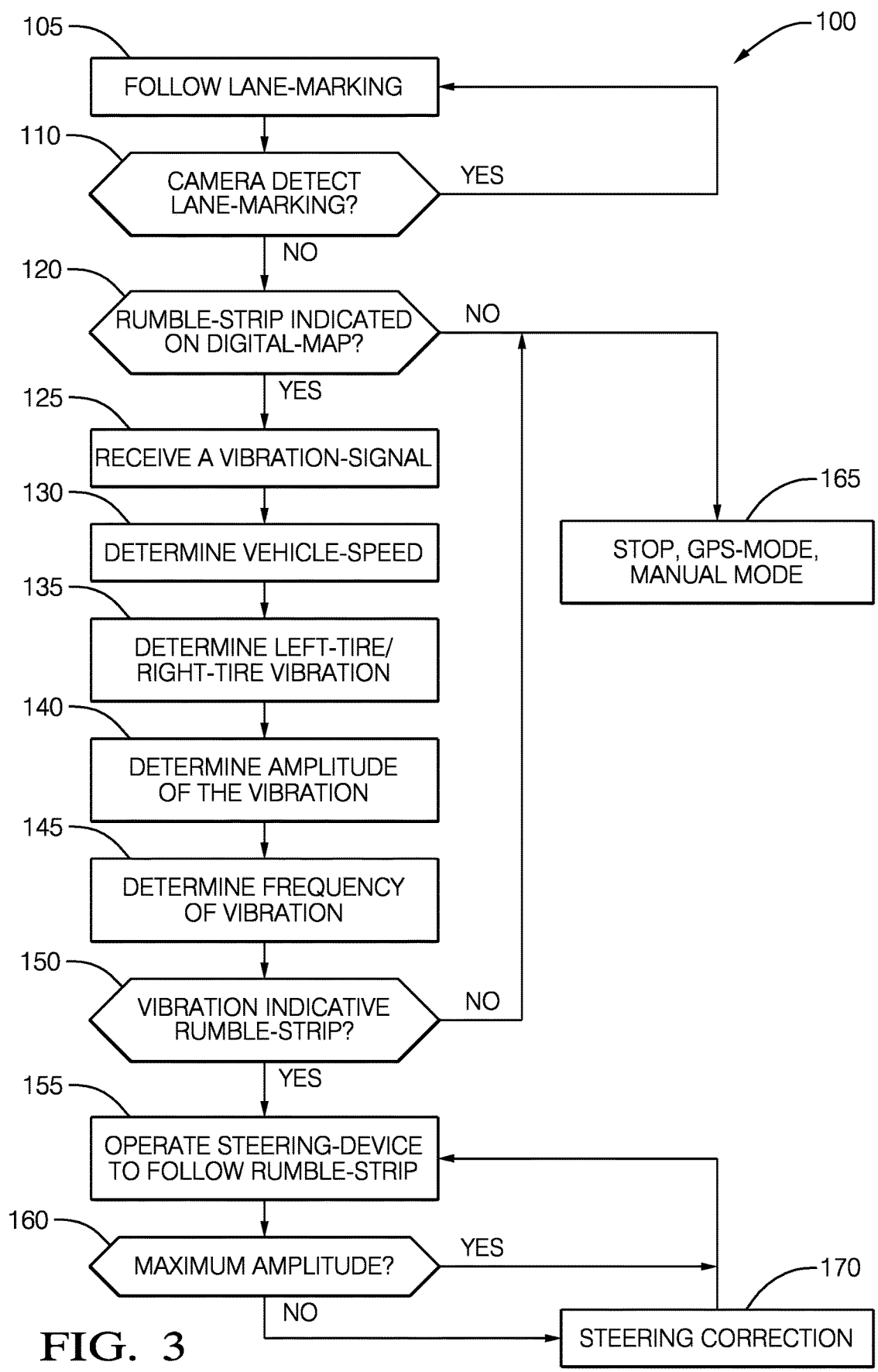
FIG. 3 is a flowchart of method of operating the system of FIG. 1 in accordance with one embodiment.

FIG. 3 illustrates a non-limiting example of a method 100 of operating automated vehicle steering to follow an instance of the rumble-strip 18. As will be explained in more detail below, some to the steps shown are optional. That is, the presence of a step shown in FIG. 3 should not be interpreted to suggest that the step is absolutely required for the system 10 to operate.

Step 105, FOLLOW LANE-MARKING, may include equipping the host-vehicle 12 with a camera 54, and the controller 34 operating the steering device 32 to keep the host-vehicle 12 at a desired position relative to the lane-marking 52 on the roadway 20 being traveled by the host-vehicle 12. The lane-marking 52 may be the only basis on which the host-vehicle 12 is steered by the controller 34, or the controller 34 may receive guidance information from other sources such as a location-detector (i.e. a GPS receiver) receiving signals from satellites as will be recognized by those in the art. Step 105 is presented only to provide the reader with a frame of reference to understand the advantages of the system 10 that become apparent if the lane-marking 52 suddenly or unexpectedly is not detected.

Step 110, CAMERA DETECT LANE-MARKING?, may include determining if/when the camera 54 detects a lane-marking 52 on a roadway 20 traveled by the host-vehicle 12. If the lane-marking 52 is detected (YES), then the method 100 may continue to loop through step 105 and step 110. However, if the lane-marking 52 is not detected (NO), e.g. the lane-marking 52 discontinues or becomes obscured for a variety of reasons (e.g. snow/ice), then the method 100 proceeds to step 115 to use an alternative method to steer or operate the host-vehicle 12.

Step 120, RUMBLE-STRIP INDICATED ON DIGITAL-MAP?, may include accessing a digital-map 56 configured to indicate coordinates 58 (e.g. GPS coordinates) of the rumble-strip 18, and operating the steering-device 32 to steer the host-vehicle 12 towards the rumble-strip 18 in accordance with a determination that (i.e. when) the digital-map indicates that the rumble-strip 18 is present beside (e.g. within four meters of) the host-vehicle 12. Alternatively, the camera 54, lidar, radar, or any other suitable sensor device may be used to detect the presence of the rumble-strip 18 while the lane-marking detection is available. It is contemplated that it can be presumed that the rumble-strip 18 is still present when sufficient snow/ice becomes present to prevent continued visual detection of the lane-marking 52 and/or the rumble-strip 18. If the presence of the rumble-strip 18 is indicated (YES) then the method 100 proceeds to detect vibration that corresponds to the tire 28 traveling on the rumble-strip 18. However, if no rumble-strip 18 is indicated (NO) on the digital-map 56, and/or no rumble strip is detected by any of the sensors of the system 10, then the method may proceed to step 165 as there are many options suggested in the automated vehicle control arts such as, but not limited to: stopping; slowing the vehicle-speed and operating on a GPS-mode (steering only according to location information from the location-detector and the digital-map 56; or forcing control of the host-vehicle 12 to a human-operator (not shown) of the host-vehicle 12, where the human-operator could be on-board or have remote control capabilities for the host-vehicle 12.

Step 125, RECEIVE A VIBRATION-SIGNAL, may include, after steering the host-vehicle 12 so the tire 28 makes initial contact with the rumble-strip 18, receiving a vibration-signal 60 from a vibration-detector 26 configured to detect vibration experienced by a host-vehicle 12 traveling a roadway 20. Vibration-analysis of the vibration-signal 60 is performed to determine a variety of characteristics such as, but not limited to, vibration-amplitude, vibration-frequency, consistency/duration of the vibration 44, or other known statistical characteristics. The goal of the vibration-analysis is the determining by the controller-circuit 34 (or processor 36) that the vibration 44 is indicative of a tire 28 of the host-vehicle 12 contacting a rumble-strip 18 arranged parallel to a heading 40 of the roadway 20.

Step 130, DETERMINE VEHICLE-SPEED, may include receiving, by the controller 34, a speed-signal (not show) from a wheel-speed-sensor (not shown), or any other known means to determine the vehicle-speed 42. Knowing the vehicle-speed 42 is advantageous to determine if the vibration-frequency 48 corresponds to what is expected from a typical embodiment of the rumble-strip 18 as the vibration-frequency 48 is expected to be directly proportional to the vehicle-speed 42 when the vibration 44 is primarily due to the tire 28 contacting the rumble-strip 18.

Step 135, DETERMINE LEFT-TIRE/RIGHT-TIRE VIBRATION, may include indicating by the vibration-detector 26 that the vibration 44 is from a left-tire 28A or a right-tire 28B of the host-vehicle 12. That is, the vibration-detector 26 may perform some signal processing that would un-burden the controller 34 or the processor 36. Alternatively, the vibration-signal 60 may be composed of raw signals from accelerometers located at the left-tire 28A and the right-tire 28B so the determination whether the left-tire 28A or the right-tire 28B is in contact with the rumble-strip 18 is left to the controller 34 or the processor 36.

Step 140, DETERMINE AMPLITUDE OF THE VIBRATION, may include filtering (e.g. a band-pass filter) the vibration-signal to suppress portions of the spectrum of the vibration-signal to reduce noise caused by, for example, an out-of-balance wheel or a pot-hole (not shown) in the roadway 20.

Step 145, DETERMINE FREQUENCY OF VIBRATION, may include performing a spectrum analysis or Fourier transform of the vibration-signal 60 to determine if the vibration-frequency 48 corresponds to an expected value given the present value of the vehicle-speed 42.

Step 150, VIBRATION INDICATIVE RUMBLE-STRIP?, may include determining by a controller-circuit 34 that the vibration 44 is indicative of (i.e. corresponds to) a tire 28 of the host-vehicle 12 contacting a rumble-strip 18 arranged parallel to a heading 40 of the roadway 40 based on data from one or more of the previous steps. If the vibration 44 does not correspond (NO) to what is expected in response to the tire 28 traveling on the rumble-strip 18, then the method 100 may proceed to step 165, which was previously described in more detail.

Step 155, OPERATE STEERING-DEVICE TO FOLLOW RUMBLE-STRIP, may include operating the steering-device 32 by the controller-circuit 34 to steer the host-vehicle such that the tire 28 follows the rumble-strip. One way to determine if the tire 28 is deviating from the rumble-strip, i.e. not generally centered on the rumble-strip 18, is by detecting that the value or magnitude of the vibration-amplitude 46 is decreasing. Step 160 is one option for controlling the steering of host-vehicle 12.

Step 160, MAXIMUM AMPLITUDE?, may include determining a vibration-amplitude 46 of the vibration 44, and operating the steering-device 32 to maximize the vibration-amplitude 46. That is, if a decrease in the vibration-amplitude 46 is detected, it may be caused by the tire 28 drifting off-center of the rumble-strip 18, so a steering-correction may be needed to steer the host-vehicle 12, or more specifically the tire 28, back to a more centered position on the rumble-strip 18. By way of example and not limitation, the controller 34 (or the processor 36) may determine from the digital-map 56 that there is a change in the curvature of the roadway 20, and as an initial guess make a steering-correction based on that change in curvature. By way of further non-limiting example, a prior steering-correction may be considered for a subsequent steering correction. For example, if initial contact with the rumble-strip 18 was made by steering from the center of the travel-lane 22 rightward toward the shoulder 24 to "find" the rumble-strip 18 as suggested in FIG. 2, then it could be presumed that the tire 28 had traveled too far to the right so a leftward steering-correction may be warranted. However, if the leftward steering-correction was not effective to increase the vibration-amplitude, then a rightward steering-correction could be attempted. As another option, the controller 34 may receive data from an inertial-measurement-unit (IMU) on the host-vehicle, and a change in the yaw-rate of the host-vehicle 12 may be used as an indicator as to which direction for a steering-correction should be used. As another example, distance to the edge of the shoulder 24 where the surface slopes downward away from the roadway, or a distance to a guard-rail (not shown) could be used to suggest or determine a steering-correction to maximize the vibration-amplitude 46.

Described herein is a first device 34 that includes one or more processors 36, memory 38, and one or more programs 62 (e.g. the vibration-analysis 62) stored in the memory 38. The one or more programs 62 may include instructions for performing all or part (e.g. selected steps) of the method 100. Also, describe herein is a non-transitory computer-readable storage medium 38 (e.g. the memory 38) comprising one or more programs for execution by one or more processors 36 of a first device 34, the one or more programs 62 including instructions which, when executed by the one or more processors 36, cause the first device 34 to perform all or part (e.g. selected steps) of the method 100.

Accordingly, a rumble-strip following system (the system 10), a controller 34 and a processor 36 for the system 10, and a method 100 of operating the system 10 are provided. These provide a means for controlling an automated vehicle (e.g. the host-vehicle 12) if/when no instance of a lane-marking 52 can be detected by on-board sensors because, for example, the lane-marking 52 is obscured by snow/ice, the lane-marking 52 is not present because the roadway 20 is under construction, the relevant sensor(s) (e.g. the camera) is inoperative (e.g. broken or covered with mud/snow/ice). By using the vibration 44 caused by the rumble-strip 18 for steering the host-vehicle 12 so a tire 28 of the host-vehicle 12 tracks the rumble-strip 18, the system 10, controller 34, the processor 36, and/or the method 100 provide a means for the host-vehicle 12 to "feel" it's way along the roadway 20 until, for example, the lane-marking 52 is again detectable.

While this invention has been described in terms of the preferred embodiments thereof, it is not intended to be so limited, but rather only to the extent set forth in the claims that follow.

We claim:

1. A rumble-strip following system for automated vehicle steering, said system comprising:
   a vibration-detector of a host-vehicle configured to detect vibration experienced by the host-vehicle traveling a roadway;
   a steering-device configured to steer the host-vehicle; and
   a controller-circuit in communication with the vibration-detector and the steering-device, said controller-circuit configured to determine that the vibration is indicative of a tire of the host-vehicle contacting a rumble-strip arranged parallel to a heading of the roadway, and operate the steering-device so the tire follows the rumble-strip, wherein the controller-circuit is configured to determine a vibration-amplitude of the vibration and operate the steering-device to maximize the vibration-amplitude.

2. The system in accordance with claim 1, wherein the vibration-detector is configured to indicate that the vibration is from a left-tire or a right-tire of the host-vehicle.

3. The system in accordance with claim 1, wherein the system includes a camera configured to detect lane-markings on the roadway traveled by the host-vehicle, and the controller-circuit is configured to operate the steering-device so the tire follows the rumble-strip when the camera is unable to detect a respective one of the lane-markings on the roadway.

4. The system in accordance with claim 1, wherein the system includes a digital-map configured to indicate coordinates of the rumble-strip, and the controller-circuit is configured to operate the steering-device to steer the host-vehicle towards the rumble-strip when the digital-map indicates that the rumble-strip is present beside the host-vehicle.

5. A controller-circuit for a rumble-strip following system for automated vehicle steering, said controller-circuit comprising:
   an input configured to receive a vibration-signal from a vibration-detector of a host-vehicle configured to detect vibration experienced by the host-vehicle traveling a roadway;
   an output configured to provide a control-signal for a steering-device configured to steer the host-vehicle; and
   a processor in communication with the vibration-detector and the steering-device, said processor configured to determine that the vibration is indicative of a tire of the host-vehicle contacting a rumble-strip arranged parallel to a heading of the roadway, and operate the steering-device so the tire follows the rumble-strip, wherein the processor is configured to determine a vibration-amplitude of the vibration and operate the steering-device to maximize the vibration-amplitude.

6. The controller-circuit in accordance with claim 5, wherein the vibration-detector is configured to indicate that the vibration is from a left-tire or a right-tire of the host-vehicle.

7. The controller-circuit in accordance with claim 5, wherein the system includes a camera configured to detect lane-markings on the roadway traveled by the host-vehicle, and the processor is configured to operate the steering-device so the tire follows the rumble-strip when the camera is unable to detect a respective one of the lane-markings on the roadway.

8. The controller-circuit in accordance with claim 5, wherein the processor is configured to access a digital-map configured to indicate coordinates of the rumble-strip, and the processor is configured to operate the steering-device so the tire follows the rumble-strip when the digital-map indicates that the rumble-strip is present beside the host-vehicle.

9. A method of operating automated vehicle steering to follow a rumble-strip, said method comprising:
   receiving a vibration-signal from a vibration-detector configured to detect vibration experienced by a host-vehicle traveling a roadway;
   determining by a controller-circuit that the vibration is indicative of a tire of the host-vehicle contacting a rumble-strip arranged parallel to a heading of the roadway;
   determining a vibration-amplitude of the vibration; and
   steering the host-vehicle to maximize the vibration amplitude, such that the tire follows the rumble strip.

10. The method in accordance with claim 9, wherein method includes indicating by the vibration-detector that the vibration is from a left-tire or a right-tire of the host-vehicle.

11. The method in accordance with claim 9, wherein the method includes determining if a camera detects lane-markings on the roadway traveled by the host-vehicle, and operating the steering-device so the tire follows the rumble-strip in accordance with a determination that the camera is unable to detect a respective one of the lane-markings on the roadway.

12. The method in accordance with claim 9, wherein the method includes accessing a digital-map configured to indicate coordinates of the rumble-strip, and operating the steering-device to steer the host-vehicle towards the rumble-strip.

* * * * *

UNITED STATES PATENT AND TRADEMARK OFFICE
CERTIFICATE OF CORRECTION

Page 1 of 1

PATENT NO. : 11,029,688 B2
APPLICATION NO. : 15/920004
DATED : June 8, 2021
INVENTOR(S) : Zachary Thomas Batts, Ludong Sun and Junqing Wei It is certified that error appears in the above-identified patent and that said Letters Patent is hereby corrected as shown below:

In the Claims

Column 8, Line 33, Claim 11, replace "the steering-device" with --a steering-device--; and Column 8, Line 39, Claim 12, replace "operating the" with --operating a--.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*